United States Patent
Funai et al.

(10) Patent No.: US 6,250,100 B1
(45) Date of Patent: Jun. 26, 2001

(54) DUAL HEAT SOURCE HIGH-TEMPERATURE REGENERATOR

(75) Inventors: Hideki Funai; Kazuhiro Yoshii; Hisao Miyazaki; Kazuya Sawakura; Daisaku Chou, all of Gunma-ken (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/538,422

(22) Filed: Mar. 29, 2000

(30) Foreign Application Priority Data

Mar. 30, 1999 (JP) ................................. 11-089711

(51) Int. Cl.$^7$ ........................................ F25B 33/00
(52) U.S. Cl. ............................... 62/497; 62/476
(58) Field of Search ..................... 62/497, 476, 271; 165/66, 909, 132; 122/155.2

(56) References Cited

U.S. PATENT DOCUMENTS

| | | | |
|---|---|---|---|
| 5,435,154 | * | 7/1995 | Nishiguchi et al. ............. 62/476 |
| 5,704,225 | * | 1/1998 | Sawakura et al. ............... 62/497 |
| 5,951,280 | * | 9/1999 | Kubota ...................... 62/497 X |

\* cited by examiner

Primary Examiner—Michael Pouell Buiz
Assistant Examiner—Chen-Wen Jiang
(74) Attorney, Agent, or Firm—Weingarten, Schurgin, Gagnebin & Hayes LLP

(57) ABSTRACT

A dual heat source high-temperature regenerator to solve problems involved in two types of conventional high-temperature regenerators for carrying out heating by using a dedicated burner as the heat source and by using exhaust gas supplied from outside systems as the heat source; namely, the former type has a problem of higher running costs, and the latter a problem of narrower ranges for capacity control. The dual heat source high-temperature regenerator arranges two inner shells and inside an outer shell to form combustion and exhaust gas flues, respectively. The combustion gas flue has a sideways U shape as a whole. The lower end is equipped with a burner, and the upper end connected to an exhaust duct. The exhaust gas flue 62 has a horizontal, straight shape as a whole. One end is provided with an exhaust gas inlet, and the other end connected to an exhaust duct. The portions where a dilute absorbent liquor collects heat easily are the vertical-stroke portion on the sideways U of the combustion gas flue and the vicinity of the end of the exhaust gas flue making the exhaust gas inlet. The vertical-stroke portion and the exhaust gas inlet are collected to the same side so that the convection current of the dilute absorbent liquor produces a smooth circulation of the liquor as shown by broken lines in the drawings.

3 Claims, 5 Drawing Sheets

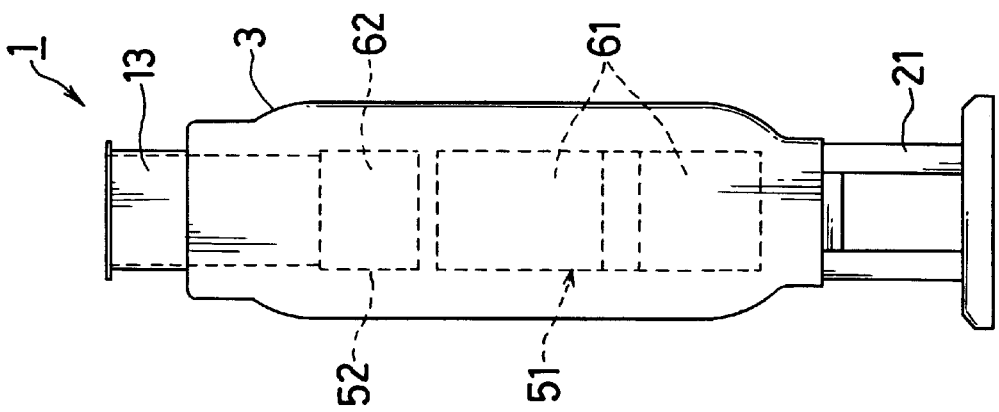
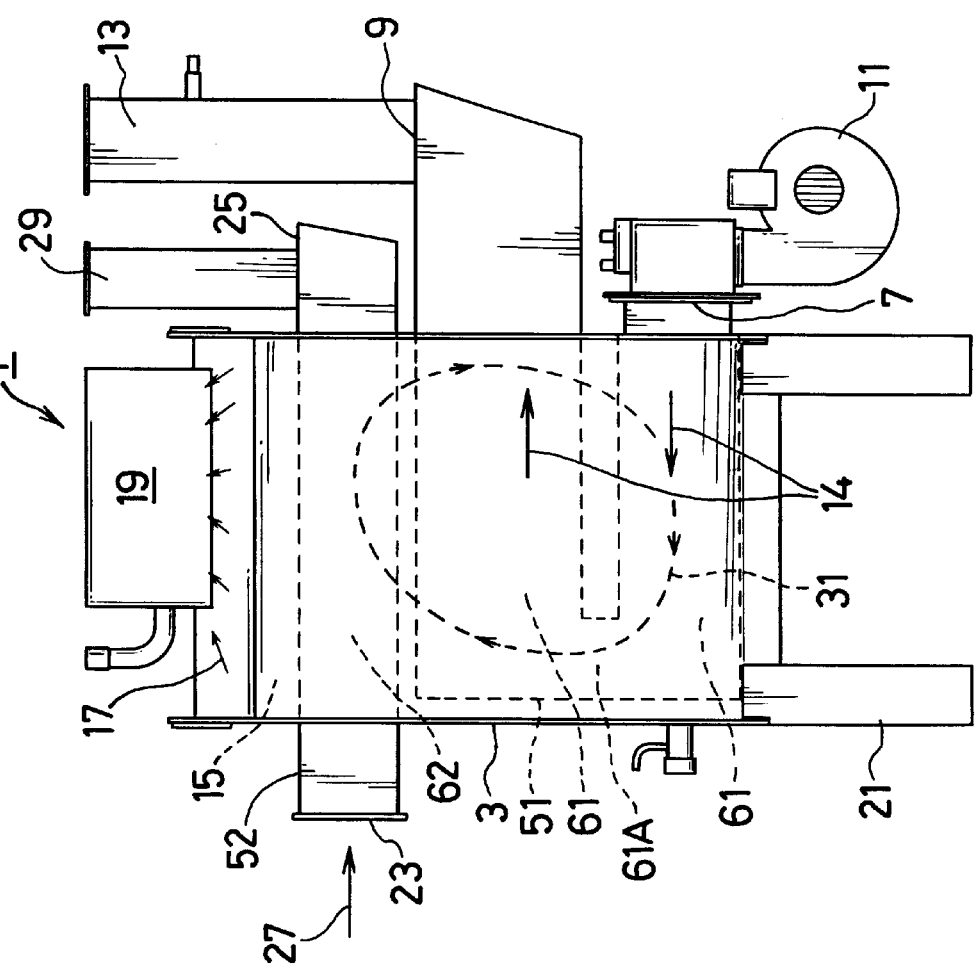

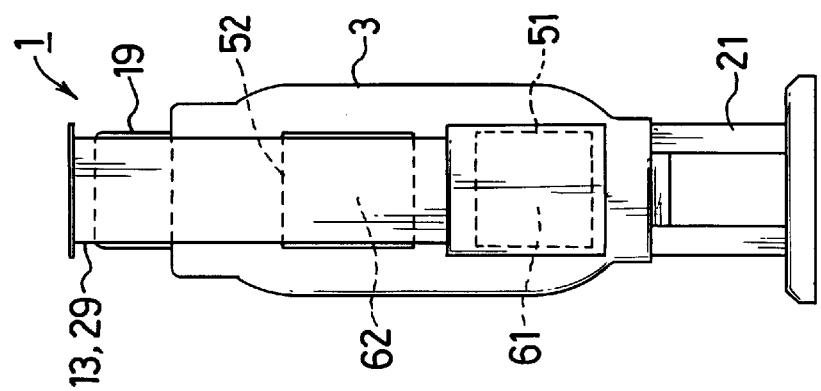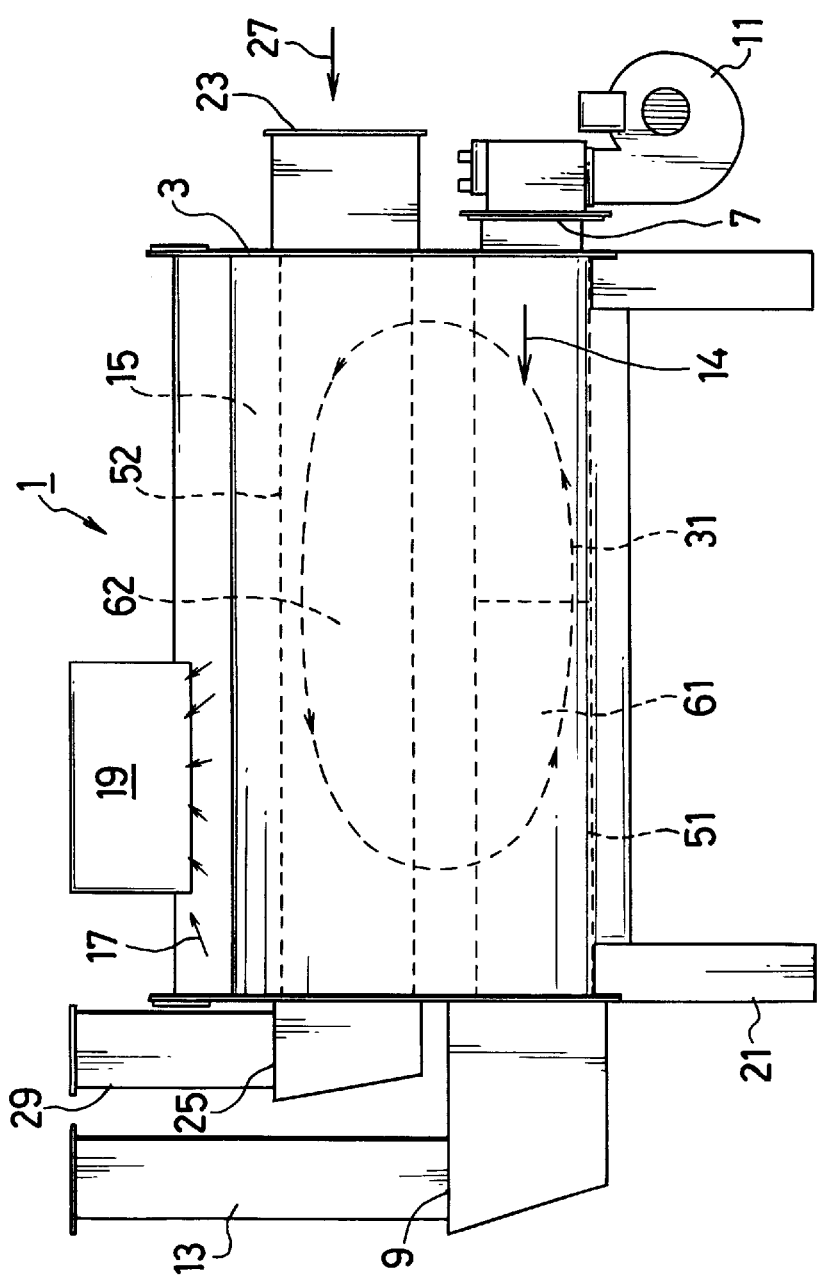

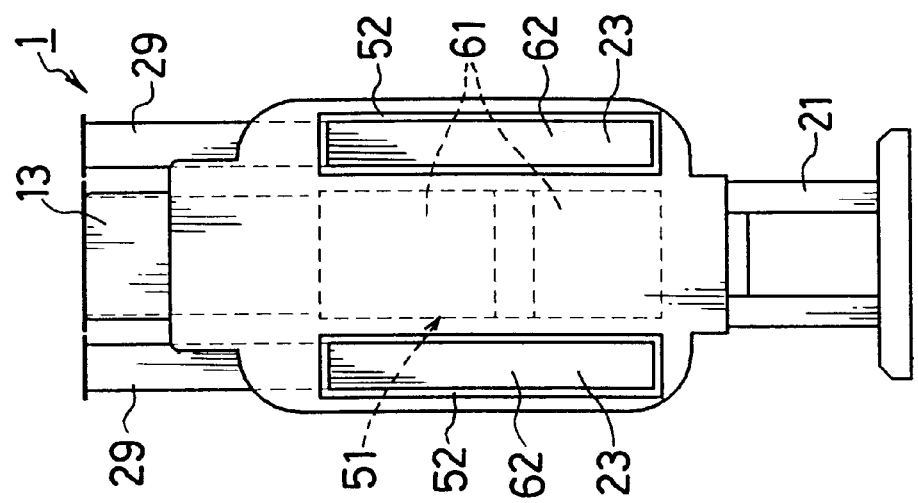
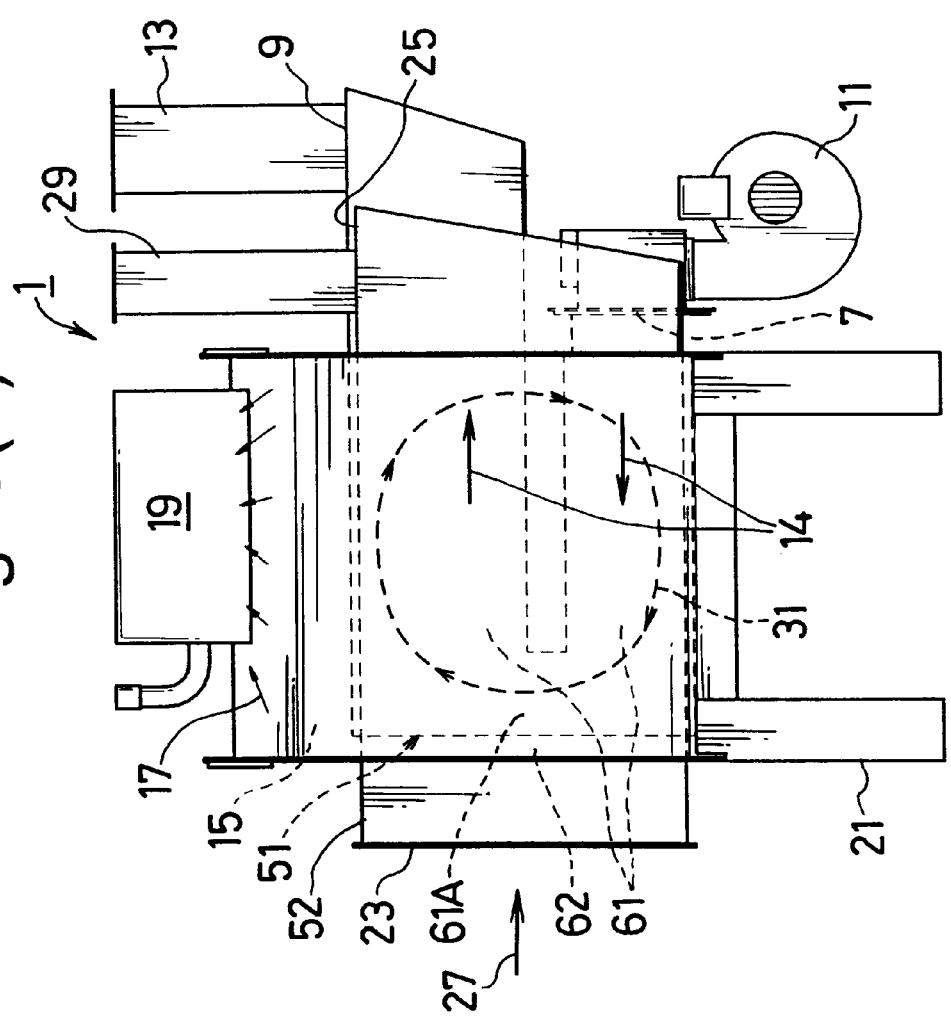

DUAL HEAT SOURCE HIGH-TEMPERATURE REGENERATOR

BACKGROUND OF THE INVENTION

1. Field of the Invention

The present invention relates to the structure of a high-temperature regenerator for an absorption type chiller heater.

2. Detailed Description of the Prior Art

Conventionally, a system referred to as an absorption type chiller heater or an absorption type refrigerator comprises a high-temperature regenerator, in which a dilute absorbent liquor flowing in from an absorber is heated to boil so that refrigerant vapor is isolated therefrom. The dilute absorbent liquor is composed of an absorbent, such as a lithium bromide (LiBr) aqueous solution (containing a surface-active agent), and a large amount of refrigerant such as water.

Conventional high-temperature regenerators use combustion gas introduced from a dedicated burner as their heat sources. Some high-temperature regenerators may use high-temperature exhaust gas that is generated and introduced from outside the absorption type chiller heaters, for example, from a gas turbine for use in power generation or the like.

FIGS. 4(A) and 4(B) show a direct-fired type high-temperature regenerator, one of the former high-temperature regenerators.

Specifically, the high-temperature regenerator 1 comprises an outer shell 3 and an inner shell 5 penetrating through the outer shell 3. This inner shell 5 has a sideways U shape with both ends 7 and 9 located outside the outer shell 3. Of these ends 7 and 9, the lower end 7 has a burner 11 mounted thereon. An exhaust duct 13 is attached to the upper end 9.

Combustion gas 14 introduced from the burner 11 is let through a combustion gas flue 6 constituted inside the inner shell 5. A dilute absorbent liquor 15 introduced to between the outer and inner shells 3 and 5 comes into contact with the inner shell 5, i.e., the combustion gas flue 6, so that the liquor 15 is heated to boil, isolating refrigerant vapor therefrom. The isolated refrigerant vapor 17 is collected to a refrigerant vapor collecting hole 19, and then introduced to a not-shown low-temperature regenerator.

As shown in FIGS. 5(A) and 5(B), the inner shell 5 sometimes constitutes a horizontal, straight-shaped combustion gas flue 6 with both ends 7 and 9 located outside the outer shell 3. Here, the burner 11 is attached to the right end 7 in FIG. 5(A), and the exhaust duct 13 is connected to the left end 9.

In a high-temperature regenerator using exhaust gas as its heat source, the capacity of the exhaust gas determines the operational capacity of the absorption type chiller heater. In other words, the capacity control is confined within the control range of the turbine. Current gas turbines are typically high in partial load limit, with the very minimum of 50% or so.

In such a high-temperature regenerator using exhaust gas as the heat source, capacity control can also be made by arranging a valve for intercepting the exhaust gas at the portion where the exhaust gas is introduced into the high-temperature regenerator, and adjusting the opening of the valve so as to allow heat input as much as required in the high-temperature regenerator. This valve, however, is expensive since it requires excellent interception performances and a high degree of reliability.

Alternatively, a high-temperature regenerator using combustion gas from a burner as its heat source may be provided along with the high-temperature regenerator using exhaust gas as its heat source. In this case, a valve on a dilute absorbent liquor pipe is switched to put the former high-temperature regenerator into exclusive use when the absorption chiller heater operates under lower loads, and to activate both high-temperature regenerators under higher loads. This configuration, however, requires a wider floor space and complicated piping. Here, an increase in running cost is also expected.

SUMMARY OF THE INVENTION

The present invention has been achieved to solve the foregoing problems. It is thus an object of the present invention to provide a dual heat source high-temperature regenerator which is capable of capacity control over a wider range, requires no expensive valves, and occupies only a smaller floor space, with not-complicated piping and a promising reduction in running cost.

To achieve the foregoing object, a first invention provides a dual heat source high-temperature regenerator for an absorption type chiller heater, the high-temperature regenerator comprising an outer shell and a plurality of inner shells, wherein: the outer shell and the inner shells form a liquor channel therebetween in which a dilute absorbent liquor introduced is heated to boil so that refrigerant vapor is isolated therefrom; one or some of the plurality of inner shells constitutes a combustion gas flue for introducing combustion gas from a burner provided for the high-temperature regenerator; the remaining inner shell or inner shells constitute(s) an exhaust gas flue for introducing high-temperature exhaust gas generated outside the absorption type chiller heater; and an exhaust gas inlet of the exhaust gas flue is located near a region on the combustion gas flue where heat is easy to collect.

Moreover, a second invention provides a dual heat source high-temperature regenerator characterized in that: among its inner shells, the one or ones constituting the combustion gas flue each has a sideways U shape as a whole, with both upper and lower ends of the U located outside the outer shell; among the inner shells, the one or ones constituting the exhaust gas flue each has a horizontal, straight shape as a whole, with both ends of the straight shape located outside the outer shell; and the region on the combustion gas flue where heat is easy to collect is the vicinity of the vertical stroke of the sideways U; and an exhaust gas inlet of the exhaust gas flue is located near the vertical stroke of the sideways U.

Furthermore, a third invention provides a dual heat source high-temperature regenerator characterized in that: among its inner shells, the one or ones constituting the combustion gas flue each has a horizontal, straight shape as a whole, with both ends of the straight shape located outside the outer shell; among the inner shells, the one or ones constituting the exhaust gas flue each has a horizontal, straight shape as a whole, with both ends of the straight shape located outside the outer shell; the region on the combustion gas flue where heat is easy to collect is the vicinity of its end forming a combustion gas inlet; and an exhaust gas inlet of the exhaust gas flue is located near the combustion gas inlet.

As described above, according to the present invention, both exhaust and combustion gas flues are arranged in a single high-temperature regenerator. This accomplishes, so to speak, integration of the two types of conventional high-temperature regenerators, thereby allowing capacity control over a wide range.

The high-temperature regenerator of the present invention requires no expensive valve for controlling the flow rate of the exhaust gas. In addition, this regenerator occupies a smaller floor space and prevents the piping from becoming complicated as compared to the case where both the high-temperature regenerator using combustion gas as the heat source and the high-temperature regenerator using exhaust gas as the heat source are provided. Moreover, the running cost can be lowered as compared to the case where the high-temperature regenerator using combustion gas as its heat source is provided alone or together with the exhaust gas type.

Furthermore, the region on the combustion gas flue where the dilute absorbent liquor collects heat most easily is arranged close to the exhaust gas inlet, which is a similar region on the exhaust gas flue where the dilute absorbent liquor collects heat most easily. This precludes a disturbance in the convection of the dilute absorbent liquor, and therefore the convection promotes circulation of the dilute absorbent liquor.

BRIEF DESCRIPTION OF THE DRAWINGS

These and other objects and advantages of the present invention will become clear from the following description with reference to the accompanying drawings, wherein:

FIG. 1(A) is a side view of a dual heat source high-temperature regenerator according to an embodiment of the present invention;

FIG. 1(B) is a front view of FIG. 1(A);

FIG. 2(A) is a side view of a dual heat source high-temperature regenerator according to a second embodiment of the present invention;

FIG. 2(B) is a front view of FIG. 2(A);

FIG. 3(A) is a side view of a dual heat source high-temperature regenerator according to a third embodiment of the present invention;

FIG. 3(B) is a front view of FIG. 3(A);

DETAILED DESCRIPTION OF THE PREFERRED EMBODIMENTS

Figure 4B:
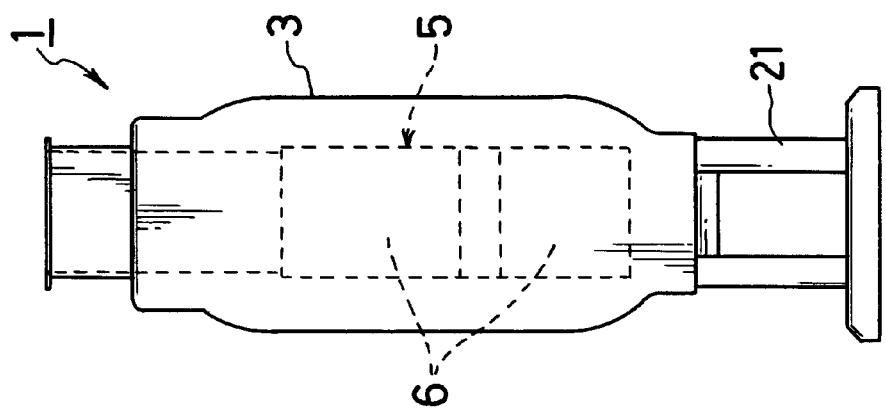
FIG. 4(B) is a front view of FIG. 4(A)
Figure 4A:
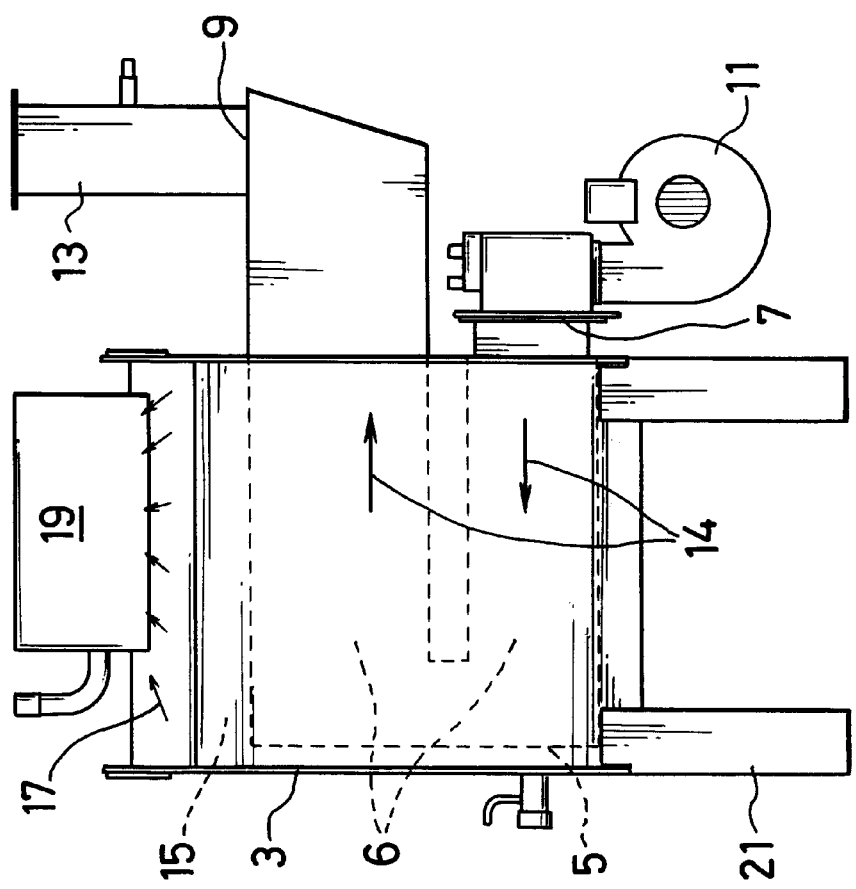
FIG. 4(A) is a side view of a high-temperature regenerator according to the first conventional example.
Figure 5B:
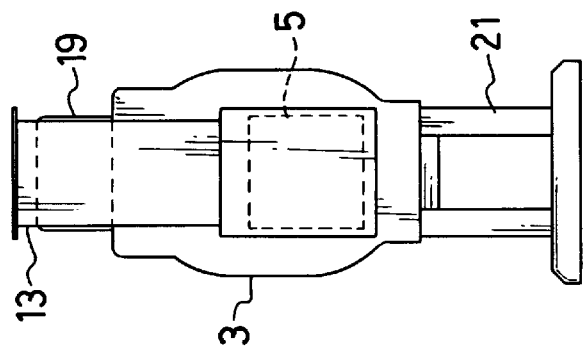
FIG. 5(B) is a front view of FIG. 5(A).
Figure 5A:
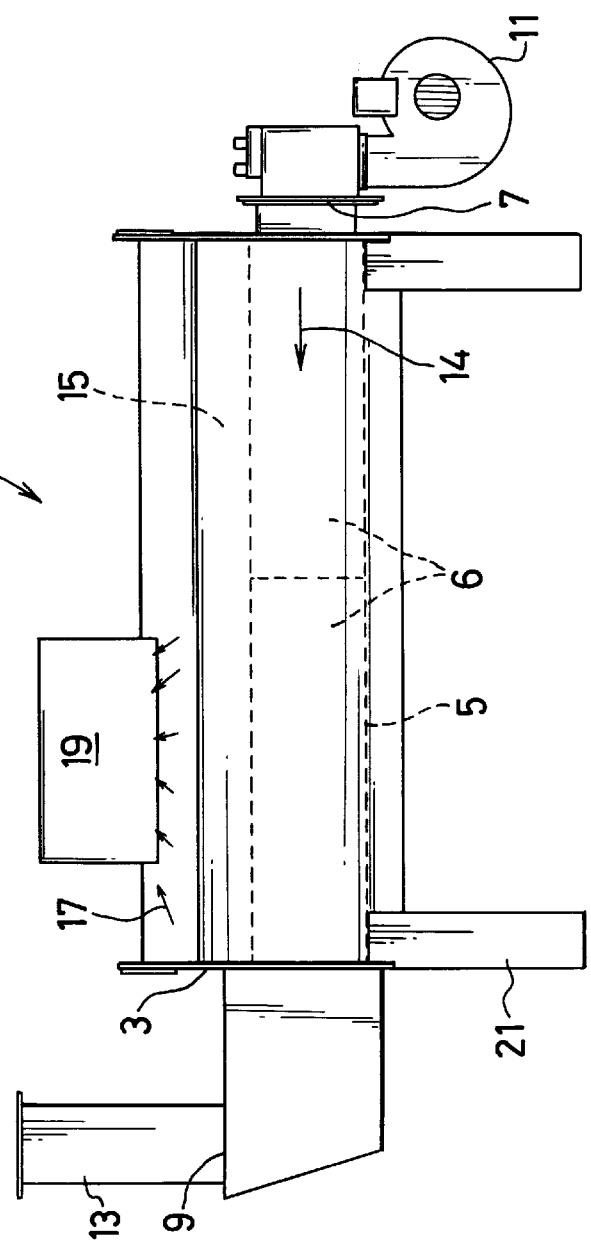
FIG. 5(A) is a side view of a high-temperature regenerator according to the second conventional example.

Now, an embodiment of the present invention will be described with reference to FIGS. 1(A) and 1(B).

A dual heat source high-temperature regenerator 1 according to the present embodiment comprises an outer shell 3 supported by legs 21. The outer shell 3 has the shape of a generally rectangular prism which is large in height, small in width, and relatively large in depth.

In the outer shell 3 are arranged two kinds of inner shells 51 and 52. Of these, one inner shell 51 is shaped like a sideways U. Both ends 7 and 9 of the U, piercing out of the outer shell 3, are vertically aligned with each other. A dedicated burner 11 for this dual heat source high-temperature regenerator 1 is mounted on the lower end 7. The other end 9 is connected to an exhaust duct 13 for external emission. The inner shell 51 thus constitutes a combustion gas flue 61. Above this inner shell 51, the other inner shell 52 is arranged to be parallel to the two arms of the above-mentioned sideways U. The inner shell 52 has a horizontal, straight shape with both ends 23 and 25 piercing out of the outer shell 3. One end 23 makes as an inlet for exhaust gas 27. The other end 25 makes as an exhaust gas outlet to which a second exhaust duct 29 is connected. The inner shell 52 thus constitutes an exhaust gas flue 62.

A not-shown dilute absorbent liquor pipe is connected to between the outer shell 3 and the inner shells 51, 52 to introduce a dilute absorbent liquor 15. Above the outer shell is arranged a refrigerant vapor collecting hole 19 for collecting refrigerant vapor 17 isolated from the dilute absorbent liquor 15.

In the configuration described above, a dilute absorbent liquor 15 from the not-shown dilute absorbent liquor pipe is introduced to the liquor channel between the outer shell 3 and the inner shells 51, 52. Here, the dilute absorbent liquor 15 comes into contact with the flue walls of the combustion and exhaust gas flues 61 and 62, thereby being heated to boil. This boiling isolates refrigerant vapor 17 from the dilute absorbent liquor 15. The isolated refrigerant vapor 17 is collected to the refrigerant vapor collecting hole 19, and then sent to a not-shown low-temperature regenerator.

Now, in the cases where the absorption chiller heater operates under lower loads and therefore the high-temperature regenerator 1 is small in heat demand, the burner 11 is exclusively activated to heat the dilute absorbent liquor 15 by means of the combustion gas 14. On the contrary, in the cases of higher loads, exhaust gas 27 supplied from a gas turbine or the like is introduced to the exhaust gas flue 62, and the burner 11 is operated to cover a deficiency in the quantity of heat. The burner 11 is also controlled in combustion rate to deal with changes in heat load.

Accordingly, the capacity control by the burner 11 is feasible over a wide range of loads. At the same time, the exhaust gas 27 from an external turbine can be utilized to reduce fuel consumption under higher loads, thereby achieving a reduction in running cost.

The region on the combustion gas flue 61 where heat is easy to collect is the vertical-stroke portion 61A of the sideways U. The reason for this is that the combustion gas 14 changes its direction to flow at the vertical-stroke portion 61A, and therefore the gas flow tends to generate eddies or the like and remain there for a long time, sufficiently heating the inner shell 51 which constitutes the combustion gas flue 61.

The region on the exhaust gas flue 62 where heat is easy to collect is the vicinity of the end 23 on which the exhaust gas inlet is established. The reason for this is that the exhaust gas flowing through the exhaust gas flue 62 is generally uniform due to the straight shape of the flue 62, and therefore the exhaust gas gradually decreases in temperature as proceeds along the flow, leaving the highest temperature in the vicinity of the exhaust gas inlet.

As seen from above, the combustion and exhaust gas flues 61 and 62 are arranged so that their regions suitable for the collection of heat approach each other.

On this account, the dilute absorbent liquor 15 in the outer shell 3 is heated more easily at the left in the FIG. 1(A). The heated dilute absorbent liquor 15 moves upward at the left side to create a clockwise, smooth, plain convection current 31 as shown by a broken line in the figure.

Suppose, in contrast, that the exhaust gas inlet of the exhaust gas flue 62 is arranged to the right in the figure. Then, the dilute absorbent liquor 15 would be heated at the right side as well as the left side of the figure, moving upward at the right side as well as the left side. These convection currents would collide with each other at the center to form disordered currents instead of the plain current as shown in FIG. 1(A). This embodiment precludes such disordered convection current, allowing smooth circulation of the dilute absorbent liquor 15 and thereby resulting in efficient heating to the dilute absorbent liquor 15.

(Other Embodiments)

In the embodiment described above, the combustion gas flue 61 has the shape of a sideways U. In another embodiment, however, the flue 61 may be formed into a horizontal, straight shape as shown in FIGS. 2(A) and 2(B). Here, since both the combustion and exhaust gas flues 61 and 62 have the horizontal, straight shapes, the dilute absorbent liquor 15 easily collects heat in the vicinities of the ends 7 and 23 which make a combustion gas inlet and the exhaust gas inlet, respectively. Therefore, both inlets are gathered to the right in FIG. 2(A) to make the dilute absorbent liquor 15 move upward at the right side. This creates a counterclockwise, plain convection current 31 as shown by a broken line in the figure. Parenthetically, like parts are designated by like reference numerals employed in the above-cited FIGS. 1(A) and 1(B).

In still another embodiment, the combustion gas flue 61 may be interposed between two exhaust gas flues 62 as shown in FIGS. 3(A) and 3(B). Even in this case, those regions where the dilute absorbent liquor 15 easily collects heat, namely, the vertical-stroke portion 61A on the U shape of the combustion gas flue 61 and the ends 23 making the exhaust gas inlets of the exhaust gas flues 62 can be arranged to the left in FIG. 3(A) to create a plain convection current 31.

In the foregoing embodiments, the liquor channel to which the dilute absorbent liquor 15 is introduced is formed between the outer shell 3 and the inner shells 51, 52. In another embodiment, however, the channel is not exclusive to between the outer shell 3 and the inner shells 51, 52. A plurality of liquor pipes may be provided to pierce through the inner shells 51, 52 vertically so that the interiors of these liquor pipes form part of the liquor channel. The provision of the plurality of liquor pipes increases the contact area with the exhaust and combustion gases 27 and 14, i.e., with the heat sources. This makes it possible to improve the performance of the high-temperature regenerator 1.

In the embodiment of FIG. 1, the exhaust gas flue 62 is arranged above the combustion gas flue 61. In yet another embodiment, however, the flues 61 and 62 may be arranged in a reversed relationship, that is to say, the exhaust gas flue 62 under the combustion gas flue 61.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A dual heat source high-temperature regenerator for an absorption type chiller heater, said high-temperature regenerator comprising an outer shell and a plurality of inner shells, wherein:

said outer shell and said inner shells form a liquor channel therebetween in which a dilute absorbent liquor introduced is heated to boil so that refrigerant vapor is isolated therefrom;

one or some of said plurality of inner shells constitute(s) a combustion gas flue for introducing combustion gas from a burner provided for said high-temperature regenerator;

the remaining inner shell or inner shells constitute(s) an exhaust gas flue for introducing high-temperature exhaust gas generated outside said absorption type chiller heater; and an exhaust gas inlet of said exhaust gas flue is located near a region on said combustion gas flue where heat is easy to collect.

2. The dual heat source high-temperature regenerator according to claim 1, wherein:

among said inner shells, the one or ones constituting said combustion gas flue each has a sideways U shape as a whole, with both upper and lower ends of the U located outside said outer shell;

among said inner shells, the one or ones constituting said exhaust gas flue each has a horizontal, straight shape as a whole, with both ends of the straight shape located outside said outer shell; and the region on said combustion gas flue where heat is easy to collect is the vicinity of the vertical stroke of the sideways U; and an exhaust gas inlet of said exhaust gas flue is located near said vertical stroke of the sideways U.

3. The dual heat source high-temperature regenerator according to claim 1, wherein:

among said inner shells, the one or ones constituting said combustion gas flue each has a horizontal, straight shape as a whole, with both ends of the straight shape located outside said outer shell;

among said inner shells, the one or ones constituting said exhaust gas flue each has a horizontal, straight shape as a whole, with both ends of the straight shape located outside said outer shell;

the region on said combustion gas flue where heat is easy to collect is the vicinity of its end forming a combustion gas inlet; and an exhaust gas inlet of said exhaust gas flue is located near said combustion gas inlet.

\* \* \* \* \*